`US006078804A`

United States Patent [19]
Alperovich et al.

[11] Patent Number: 6,078,804
[45] Date of Patent: *Jun. 20, 2000

[54] PROVIDING DIFFERENT ROUTING TREATMENTS FOR EMERGENCY CALLS BASED ON SUBSCRIBER SPECIFIED DATA

[75] Inventors: Vladimir Alperovich, Dallas; Eric Valentine, Plano, both of Tex.

[73] Assignee: Ericsson Inc., Research Triangle Park, N.C.

[*] Notice: This patent issued on a continued prosecution application filed under 37 CFR 1.53(d), and is subject to the twenty year patent term provisions of 35 U.S.C. 154(a)(2).

[21] Appl. No.: 08/633,862

[22] Filed: Apr. 15, 1996

Related U.S. Application Data

[63] Continuation-in-part of application No. 08/574,554, Dec. 19, 1995, abandoned.

[51] Int. Cl.[7] .................................................. H04Q 7/38
[52] U.S. Cl. .............................. 455/404; 455/66; 455/433; 455/563
[58] Field of Search ........................ 455/404, 414, 455/445, 433, 563, 66; 379/207, 45

[56] References Cited

U.S. PATENT DOCUMENTS

| | | | |
|---|---|---|---|
| 5,043,736 | 8/1991 | Darnell et al. | 342/357 |
| 5,185,785 | 2/1993 | Funk et al. | 379/111 |
| 5,216,678 | 6/1993 | Nawaki | 371/68.1 |
| 5,218,367 | 6/1993 | Sheffer et al. | 342/457 |
| 5,276,441 | 1/1994 | Katsurada et al. | 340/825.03 |
| 5,291,399 | 3/1994 | Chaco | 364/413 |
| 5,299,260 | 3/1994 | Shaio | 379/265 |
| 5,303,285 | 4/1994 | Kerihuel et al. | 379/58 |
| 5,329,578 | 7/1994 | Brennan et al. | 379/67 |
| 5,334,944 | 8/1994 | Hirakata | 330/6 |
| 5,335,276 | 8/1994 | Thompson et al. | 380/21 |
| 5,343,493 | 8/1994 | Karimullah | 375/1 |
| 5,347,544 | 9/1994 | Garcia et al. | 375/36 |
| 5,377,256 | 12/1994 | Franklin et al. | 455/404 |
| 5,388,147 | 2/1995 | Grimes | 379/59 |
| 5,408,528 | 4/1995 | Carlson et al. | 379/211 |
| 5,410,739 | 4/1995 | Hart | 455/66 |
| 5,418,837 | 5/1995 | Johansson et al. | 379/58 |
| 5,444,760 | 8/1995 | Russ | 379/45 |
| 5,465,388 | 11/1995 | Zicker | 455/404 |
| 5,479,482 | 12/1995 | Grimes | 455/404 |
| 5,519,760 | 5/1996 | Borkowski et al. | 455/404 |
| 5,555,286 | 9/1996 | Tendler | 455/404 |
| 5,630,209 | 5/1997 | Wizgall et al. | 455/66 |
| 5,659,597 | 8/1997 | Bareis et al. | 455/563 |
| 5,689,548 | 11/1997 | Maupin et al. | 455/404 |
| 5,712,900 | 1/1998 | Maupin et al. | 455/433 |

FOREIGN PATENT DOCUMENTS

| | | |
|---|---|---|
| 632635 | 4/1995 | European Pat. Off. . |
| 63-299659 | 12/1988 | Japan . |

OTHER PUBLICATIONS

Ryan, Stewart, "Enhancing Incident Response Thriugh Driver Information", IEE Seminar on using ITS in Public Transport and in Emergency Services, Dec. 1998.

*Primary Examiner*—William Cumming
*Attorney, Agent, or Firm*—Jenkens & Gilchrist PC

[57] ABSTRACT

Before routing an emergency call setup request signal received from a mobile subscriber toward a particular emergency service terminal, subscriber specified data associated with that particular subscriber are retrieved. By analyzing such retrieved data, the serving mobile switching center is better able to ascertain the individual need of the mobile subscriber and accordingly routes the emergency call towards the appropriate emergency service operator capable of providing effective assistance to the mobile subscriber in need.

22 Claims, 4 Drawing Sheets

PROVIDING DIFFERENT ROUTING TREATMENTS FOR EMERGENCY CALLS BASED ON SUBSCRIBER SPECIFIED DATA

CROSS REFERENCE TO RELATED APPLICATION

This application is a continuation-in-part of U.S. application for patent, Ser. No. 08/574,554, filed Dec. 19, 1995, now abandoned titled "Radio Transceiver Memory Device and Method for Facilitating Emergency Communications" by Eric Valentine.

BACKGROUND OF THE INVENTION

1. Technical Field of the Invention

The present invention relates to a mobile telecommunications network and, in particular, to the routing of emergency calls based on subscriber specified data.

2. Description of Related Art

The Emergency Service Bureau (ESB) or more commonly known in the United States as 9-1-1 service provides emergency assistance to a person in dire need of help. In order to minimize the subscriber effort needed in setting up a telecommunications call connection to the appropriate ESB terminal, subscribers have to only dial a unique short number (such as 911 in the United States). However, even with such a rapid call establishment, there are a number of impediments hindering the ESB from providing effective assistance to a mobile subscriber in need. One such impediment is a language barrier between the mobile subscriber and the ESB. Another impediment is a special medical condition of the mobile subscriber which needs to be immediately communicated to the ESB.

With the continuing development of a mobile telecommunications system and especially the Personal Communications System (PCS), mobile subscribers are able to utilize their existing mobile stations and subscriptions while traveling in a foreign country to make and receive mobile calls. However, not all mobile subscribers are able to speak the national language of the visited country. Also, especially around the border areas between two different countries, such as the United States and Mexico, there are an increasing number of telecommunications subscribers who cannot effectively speak the predominant language of the country where they are currently residing or traveling. For those mobile subscribers who cannot fluently speak the national language, having an emergency service operator who can speak the mobile subscribers' native language is an important factor in effectively providing emergency services.

Conventionally, whenever an emergency call is established between a mobile subscriber and an ESB terminal, an ESB operator or dispatcher has to manually determine that the originating mobile subscriber does not speak the national language and accordingly forward the call to another operator capable of handling the necessary foreign language. Moreover, if the mobile subscriber has certain medical conditions, the first ESB operator might have to again forward the call to a properly trained medical personnel. However, such a manual rerouting is disadvantageous because it delays the emergency call connection between the mobile subscriber and the appropriate ESB operator. For the mobile subscriber requesting an emergency call connection, such a delay creates additional frustration and anxiety further aggravating the emergency situation.

Accordingly, there is a need for a mechanism to automatically route an emergency call connection to an ESB terminal capable of effectively handling the situation associated with a particular mobile subscriber.

SUMMARY OF THE INVENTION

The present invention provides a method and apparatus within a mobile telecommunications system for routing an emergency call toward an appropriate emergency service terminal by utilizing subscriber specified data. A signal requesting an emergency call connection is received by the serving mobile switching center (MSC) associated with a particular mobile station. The serving MSC then retrieves subscriber specified data associated with that particular mobile station. The retrieved subscriber specified data are then analyzed by the serving MSC to determine which emergency service terminal should be alerted for this particular emergency call. The subscriber specified data may indicate the mobile subscriber's preferred language and, as a result, the serving MSC accordingly routes the emergency call to an emergency service terminal with an operator capable of handling that particular language. The subscriber specified data may also include subscriber medical data. The data are further analyzed and utilized to route the call to a terminal with an operator capable of handling such medical conditions. The subscriber specified data may further indicate special equipment needed by the mobile subscriber to communicate with an emergency operator.

In one embodiment, the signal requesting an emergency call connection transmitted by the mobile station encapsulates the subscriber specified data. After the request signal is received by the serving MSC, an application module within the serving MSC extracts the encapsulated subscriber specified data. The extracted subscriber specified data are then analyzed to determine the appropriate ESB terminal.

As another embodiment, the subscriber specified data may be stored into a home location register (HLR) responsible for storing subscriber information representing that particular mobile station. Whenever the serving MSC performs a location update process, the stored subscriber specified data are copied over to a local register, such as a visitor location register (VLR), within the serving MSC. After receiving the request signal, the serving MSC retrieves the copied subscriber specified data from the local register for analysis.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
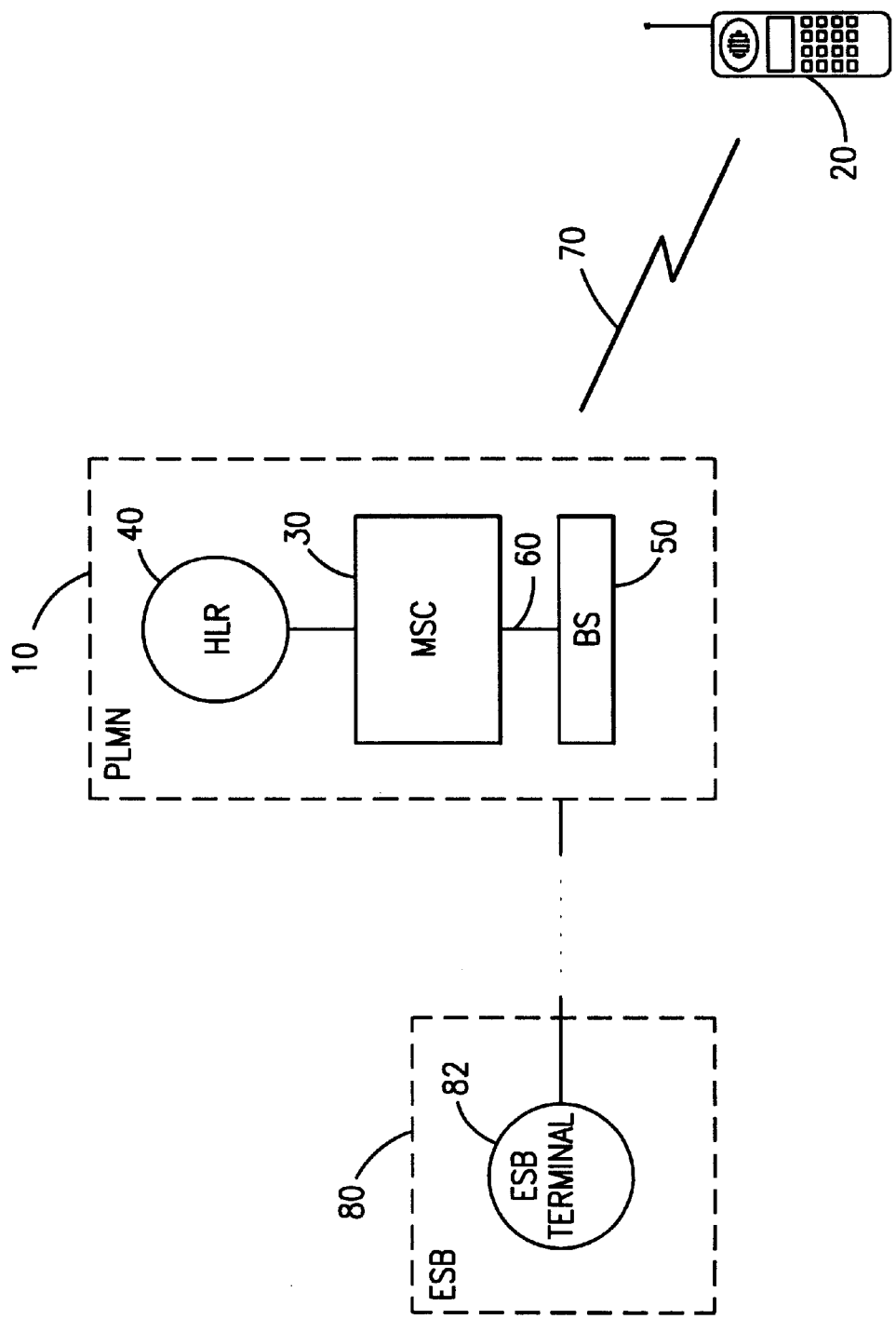
FIG. 1 is a block diagram of a Public Land Mobile Network (PLMN) establishing a call connection between a mobile station and an Emergency Service Bureau (ESB) terminal.

FIG. 1 is a block diagram of a conventional Public Land Mobile Network (PLMN) such as an analog or digital cellular telecommunications network. The PLMN 10, which is used to communicate with a mobile station 20, comprises a mobile switching center (MSC) 30, a home location register (HLR) 40, a visitor location register (VLR, not shown in FIG. 1 but usually co-located with the MSC 30 and collectively referred to as an MSC/VLR), and a base station 50. The BS 50 is connected to the MSC 30 using a digital communications link 60, and communicates with the mobile station 20 via a radio channel 70. The HLR 40 is a database containing information about all "home" subscribers, their services and location. For example, the HLR 40 keeps record of the MSC/VLR currently serving each home subscriber for delivering future incoming calls.

A call from the mobile subscriber starts when the mobile subscriber first keys in the desired destination number and then presses the send button. An access channel is seized, whereupon the mobile identity and the entered number are automatically transmitted to the MSC 30 via the BS 50. The MSC 30 then verifies that the caller has access to the system. The keyed number is also analyzed to determine if the caller is allowed to call that particular number or to invoke a subscriber feature associated with the entered service code. If all analyses are affirmative, the mobile station 20 is assigned to an analog or digital voice channel 70 and the call is setup.

Whenever the mobile station 20 dials a number representing the Emergency Service Bureau (ESB, more commonly known as 9-1-1 service in the United States) 80, the serving MSC 30 determines that the mobile subscriber is requesting an emergency call connection, and routes the call to the most appropriate ESB 80 connected to the PLMN 10. While routing the emergency call to one of the ESB terminals 82 within the ESB 80, the MSC 30 cannot ascertain any special conditions or requirements associated with each mobile subscriber. The subscriber may not speak the national language or may have special medical conditions requiring a specially trained medical personnel. Conventionally, an initial determination needs to be made by the operator at the first ESB terminal 82 answering the emergency call, and if the first ESB operator is not capable of handling the requirement indicated by the mobile subscriber, the call must be rerouted to another qualified operator. However, this is disadvantageous because it further delays the call connection time and increases the anxiety and frustration faced by the mobile subscriber in need. However, in order to alleviate the above problem, a number of ESB operators or dispatchers qualified to cover all major contingencies have to be stationed at each ESB center. Such a configuration is expensive and wasteful.

Figure 2:
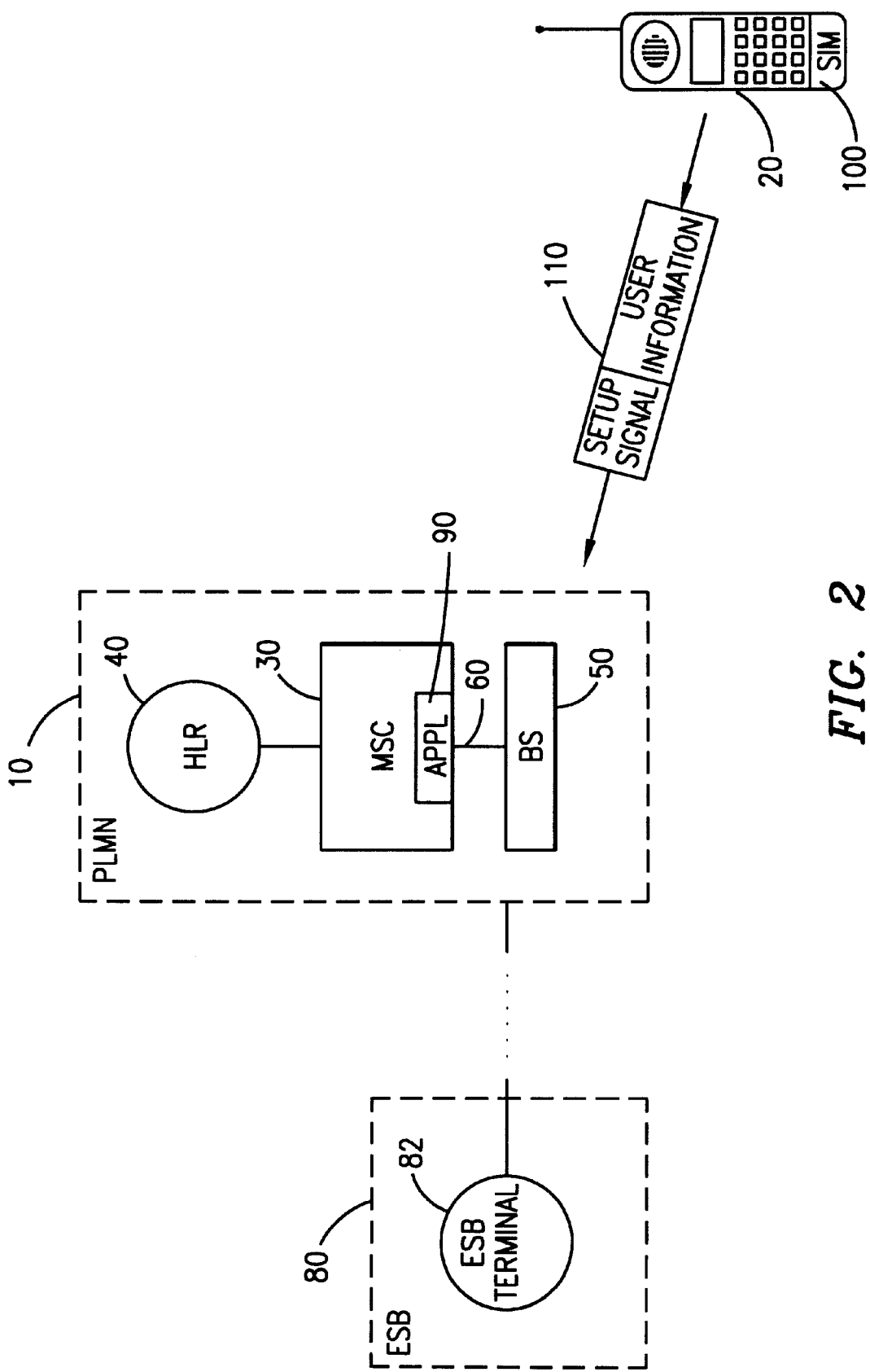
FIG. 2 is a block diagram illustrating the communication of a call setup request signal between the mobile station and the serving mobile switching center (MSC) within the PLMN.

Reference is now made to FIG. 2 where the communication of a call setup request signal encapsulating subscriber specified data between the mobile station 20 and the serving MSC 30 is shown. As fully disclosed in a parent application for patent, Ser. No. 08/574,554, filed Dec. 19, 1995, titled "Radio Transceiver Memory Device and Method for Facilitating Emergency Communications" by Eric Valentine (hereinafter referred to as the Valentine application), an used data section of a call setup request signal is utilized to transport subscriber specified data between the mobile station 20 and the ESB terminals 82. A memory register attached to the mobile station 20 known as a Subscriber Identity Module (SIM) card 100 stores the data associated with the mobile subscriber. Such subscriber specified data can be manually input into the SIM card via a key pad attached to the mobile station 20 or encoded by a service provider as more fully disclosed in the Valentine application. Whenever the mobile station 20 originates an emergency call setup request, the subscriber specified data stored in the SIM card 100 are retrieved and encapsulated into the request signal 110. The call setup request signal such as a Direction Transfer Application Part (DTAP) signal is then transmitted to the BS 50. An application module 90 within the serving MSC 30, after receiving the call setup request signal 110, extracts the encapsulated user defined data and transparently forwards the extracted data to the appropriate ESB terminal 80. Since the mobile station 20 is not fixed to a particular geographic location or to a physical communications line, by utilizing the subscriber specified data, the ESB service provider can better identify the subscriber and effectively provide the necessary medical or emergency assistance. As an illustration, the mobile subscriber may transmit the license plate number or the description of the car he is currently driving. The mobile subscriber may further transmit his blood type or medical conditions requiring special medical assistance. Such subscriber dependent information is especially helpful when the mobile subscriber is not able to verbally communicate the crucial information to the operator due to the seriousness of his situation.

In accordance with the Valentine invention, even though the application module 90 within the serving MSC 30 extracts the encapsulated subscriber specified data from the received call setup request signal 110, the contents of the data are not manipulated or reviewed by the serving MSC 30 and are transparently forwarded to the ESB terminal 82. It is not until the subscriber specified data are manually reviewed by the ESB operator, that necessary equipment or personnel can be determined. It would therefore be advantageous for the serving MSC to review and analyze relevant portions of the received subscriber specified data to automatically forward the emergency call to a particular ESB terminal 82 capable of providing the necessary service or equipment mandated by the mobile subscriber.

Figure 3:
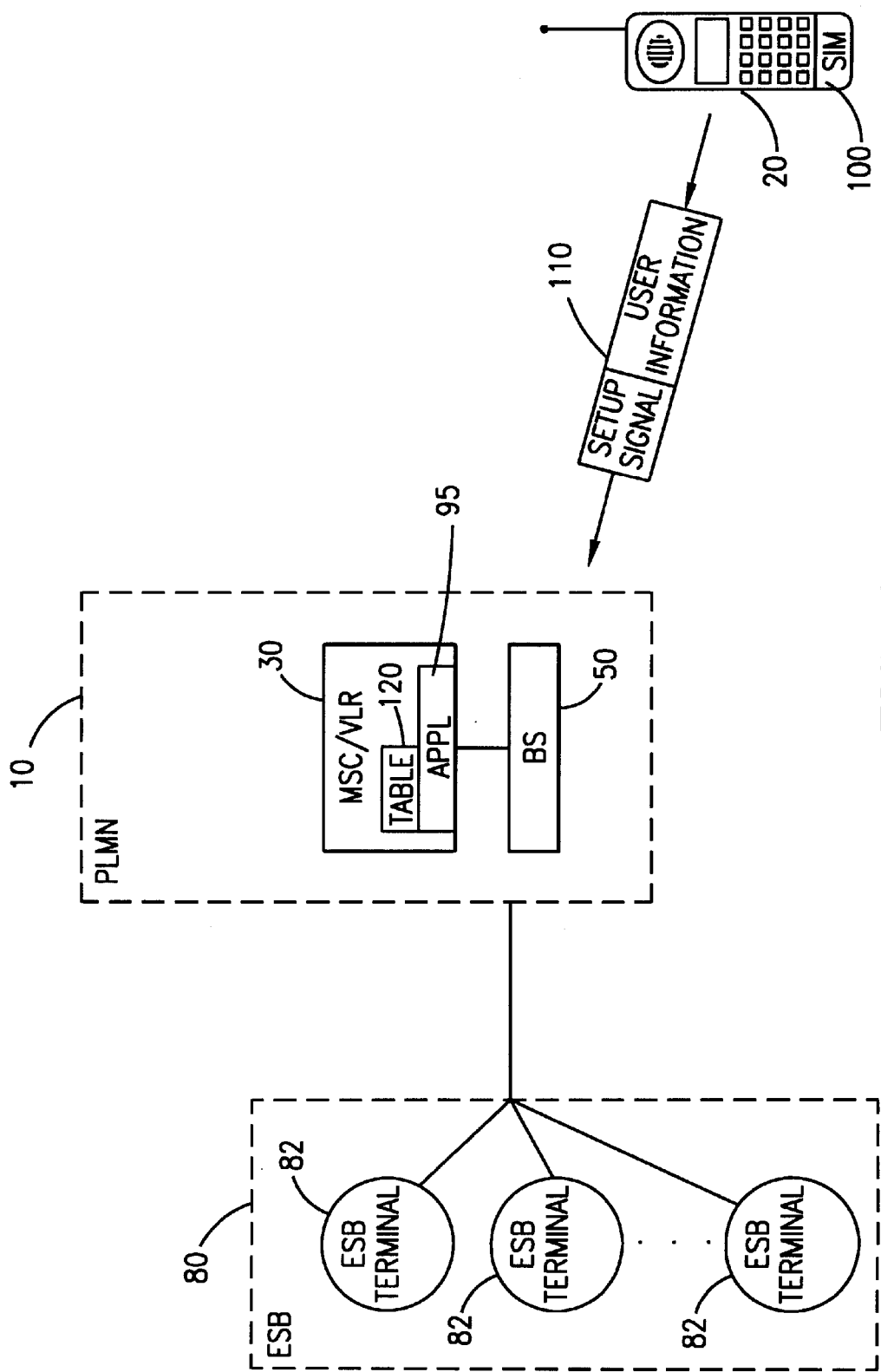
FIG. 3 is a block diagram illustrating the communication of a call setup request signal encapsulating user specified data between the mobile station and the serving MSC.

Reference is now made to FIG. 3 where the serving MSC 30 is shown analyzing the subscriber specified data in accordance with the teachings of the present invention. The analyzed subscriber specified data are utilized by the serving MSC 30 to establish an emergency call connection with a particular ESB terminal 82 capable of meeting the requirements specified by the mobile station 20. A memory register such as the SIM card 100 attached to the mobile station 20 stores the subscriber specified data. Whenever the mobile subscriber transmits the emergency call setup request signal 110, the previously stored subscriber specified data are retrieved from the SIM card 100 and encapsulated into the request signal 110. The transmitted request signal 110 is then transported to the serving MSC 30 via the BS 50. The application module 95 within the serving MSC 30 then extracts the subscriber specified data encapsulated in the received request signal 110 and analyzes the data to determine the requirements or conditions indicated by the mobile subscriber. Such an analysis can be performed utilizing a memory table 120 to determine the requirements specified by the user defined value. For example, the numerical value of one in a certain tag or data parameter implies that the mobile subscriber is a Spanish speaker. Alternatively, the numerical value of ten in another data field or parameter implies that the mobile subscriber is a diabetic. Utilizing such analyzed data, the application module 90 determines an appropriate ESB terminal 82 associated with the ESB 80. In accordance with the teachings of the present invention, if the mobile subscriber indicates that his preferred language is Spanish, the application module 90 routes the emergency call to an ESB terminal 82 stationed with a Spanish speaking dispatcher. If the mobile subscriber indicates that he is a diabetic, the application module 90 accordingly routes the call to an ESB terminal 82 stationed with a qualified nurse for providing the necessary medical assistance. The memory table 120 or, alternatively another memory table within the PLMN 10 accessible by the MSC/VLR 30, may store the data indicative of the available equipment and personnel associated with each ESB terminal 82. Utilizing such data, resources can be more evenly distributed across the ESB terminals 82, and emergency call connections more effectively established.

Figure 4:
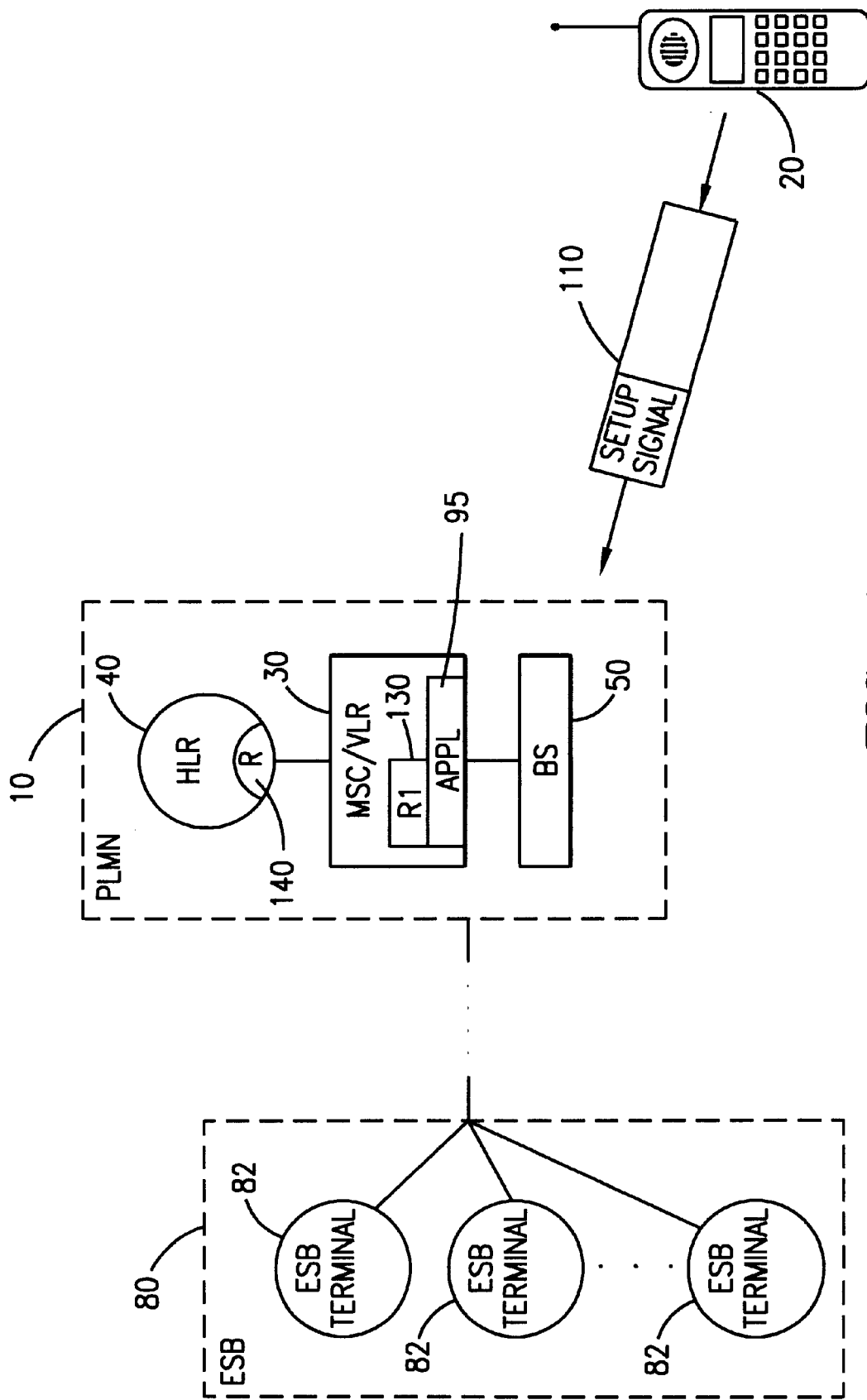
FIG. 4 is a block diagram illustrating the serving MSC retrieving prestored subscriber specified data from an internal register and establishing an emergency call connection with a particular ESB terminal by utilizing the retrieved data.

FIG. 4 illustrates another embodiment in accordance with the teachings of the present invention. The mobile subscriber associated with the mobile station 20 first stores the desired data such as his preferred language or medical conditions to a memory register (R) 140 within the home HLR 40. Such storing can be accomplished via manual dialing in a manner similar to the activation of a subscriber service feature such as the speed calling feature. Alternatively, it can be accomplished via a number of unstructured data communications signals currently provided by the GSM environment. Such signals include Short Service Messages (SMS) or Unstructured Supplementary Service Data (USSD) messages transmitted over a control channel. Whenever the mobile subscriber transmits the desired data, the application module 95 within the serving MSC 30 receives the transmitted data and updates the register (R) 140 within the HLR 40. Such an update can be performed using a Mobile Application Part (MAP) signal utilized for transporting data between an MSC and an HLR. Subsequently, whenever the mobile station 20 moves into a new MSC/VLR area or turns on its unit for the first time, the serving MSC 30 performs a location update process with the home HLR 40. Such a location update procedure to inform the home HLR of the current location of the mobile station 20 is performed regardless of whether the MSC is within the home PLMN 10 or a visited PLMN. During the location update process, subscriber telecommunications data including the previously stored subscriber specified data in the register (R) 140 are copied to a local register (R1) 130 within the MSC/VLR 30. Therefore, before any call setup request signal is originated by the mobile station 20, the necessary subscriber telecommunications data including the subscriber specified data are stored in the serving MSC 30. As a result, further communication between the serving MSC 30 and the home HLR 40 is eliminated reducing the network signal traffic level.

The mobile station 20 then transmits the request signal 110 requesting an emergency call connection to the serving PLMN 10. Unlike the request signal described in FIG. 3, the request signal 110 does not encapsulate any subscriber specified data. The MSC 30 receives the transmitted signal via the BS 50 and determines that the request is for an emergency call connection. The application module 95 within the serving MSC 30 then retrieves the stored subscriber specified data from the internal memory register (R1) 130. By utilizing the retrieved data, the application module 95 is able to determine the appropriate facility or service required to properly service that particular mobile subscriber and the emergency call is accordingly route to the proper ESB terminal 82 in the manner described with respect to FIG. 3.

By utilizing subscriber specified data associated with a particular mobile subscriber, the serving PLMN is able to better serve the mobile subscriber having individual requirement by providing safer and more responsive emergency service.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for establishing an emergency call connection within a telecommunications system, said emergency call connection established to a particular one of a plurality of emergency service terminals in response to a transmission by a mobile station of an emergency call setup request signal, said method comprising the steps of:

storing subscriber specified data associated with said mobile station in a register, said subscriber specified data comprising language preference data;

receiving said emergency call setup request signal from said mobile station;

retrieving said subscriber specified data associated with said mobile station;

analyzing said retrieved subscriber specified data to identify the particular one of the plurality of emergency service terminals preferred for serving said mobile station based on the retrieved subscriber specified data, said step of analyzing comprising analyzing said language preference data to identify said particular emergency service terminal preferred for handling an emergency call connection with said mobile station based on a language specified by said language preference data; and establishing an emergency call connection between said mobile station and said identified particular one of the emergency service terminals.

2. The method of claim 1 wherein said emergency call setup request signal encapsulates said subscriber specified data and said step of receiving said request signal further comprises the step of receiving said subscriber specified data encapsulated in said request signal.

3. The method of claim 2 wherein said step of retrieving said subscriber specified data further comprises the step of extracting said subscriber specified data encapsulated in said request signal.

4. The method of claim 1 wherein said telecommunications system further comprises a mobile switching center (MSC) serving said mobile station, said MSC including said register for storing said subscriber specified data and wherein said step of retrieving further comprises the step of retrieving said subscriber specified data from said register.

5. The method of claim 4 wherein said telecommunications system further comprises a home location register (HLR), said HLR initially storing said subscriber specified data and said subscriber specified data copied from said HLR to said register during a location update process.

6. A mobile switching center (MSC) for establishing an emergency call connection within a mobile telecommunications network to a particular one of a plurality of emergency service terminals, said MSC comprising:

means for receiving an emergency call setup request;

an application module for retrieving subscriber specified language preference data associated with a mobile subscriber station in response to said emergency call setup request, said subscriber specified language preference data associated with said mobile subscriber prior to a transmission of said call setup request;

means for analyzing said subscriber specified language preference data to identify the particular one of the plurality of emergency service terminals preferred for handling an emergency call connection based on the retrieved subscriber specified language preference data; and means for establishing said emergency call connection between the mobile subscriber station and said identified particular one of the emergency service terminals.

7. The MSC of claim 6 wherein said application module retrieves said subscriber specified language preference data from a signal transmitted over a control channel.

8. The MSC of claim 7 wherein said signal comprises a call setup request signal, said call setup request signal storing said emergency call setup request.

9. The MSC of claim 6 wherein said MSC further comprises a register, said register storing said subscriber specified language preference data, and wherein said application module retrieves said subscriber specified language preference data from said register.

10. The method of claim 1 wherein said subscriber specified data is retrieved from said register.

11. The method of claim 10 wherein said register is located within a mobile switching center/visitor location register (MSC/VLR).

12. The method of claim 1 wherein said register comprises a subscriber identity module (SIM) located in said mobile station, said method further comprising the steps of:

retrieving said subscriber specified data from said SIM; and encapsulating said subscriber specified data in said emergency call setup request signal.

13. The method of claim 12 wherein said step of retrieving said subscriber specified data associated with said mobile station further comprises the step of extracting said subscriber specified data encapsulated in said request signal.

14. A method for establishing an emergency call connection within a telecommunications system, said emergency call connection established to a particular one of a plurality of emergency service terminals in response to a transmission by a mobile station of an emergency call setup request signal, said method comprising the steps of:

storing subscriber specified data associated with said mobile station in a register, said subscriber specified data comprising subscriber medical data;

receiving said emergency call setup request signal from said mobile station;

retrieving said subscriber specified data associated with said mobile station;

analyzing said retrieved subscriber specified data to identify the particular one of the plurality of emergency service terminals preferred for serving said mobile station based on the retrieved subscriber specified data, said step of analyzing comprising analyzing said subscriber medical data to identify said particular emergency service terminal preferred for handling an emergency call connection with said mobile station based on a medical condition specified by said subscriber medical data; and establishing an emergency call connection between said mobile station and said identified particular one of the emergency service terminals.

15. The method of claim 11 wherein said emergency call setup request signal encapsulates said subscriber specified data and said step of receiving the request signal further comprises the step of receiving said subscriber specified data encapsulated in said request signal.

16. The method of claim 15 wherein said step of retrieving said subscriber specified data further comprises the step of extracting said subscriber specified data encapsulated in said request signal.

17. The method of claim 11 wherein said telecommunications system further comprises a mobile switching center (MSC) serving said mobile station, said MSC including said register for storing said subscriber specified data and wherein said step of retrieving further comprises the step of retrieving said subscriber specified data from said register.

18. The method of claim 17 wherein said telecommunications system further comprises a home location register (HLR), said HLR initially storing said subscriber specified data and said subscriber specified data copied from said HLR to said register during a location update process.

19. The method of claim 11 wherein said subscriber specified data is retrieved from said register.

20. The method of claim 11 wherein said register is located within a mobile switching center/visitor location register (MSC/VLR).

21. The method of claim 11 wherein said register comprises a subscriber identity module (SIM) located in said mobile station, said method further comprising the steps of:

retrieving said subscriber specified data from said SIM; and encapsulating said subscriber specified data in said emergency call setup request signal.

22. The method of claim 21 wherein said step of retrieving said subscriber specified data associated with said mobile station further comprises the step of extracting said subscriber specified data encapsulated in said request signal.

* * * * *